Patented Jan. 10, 1933

1,893,761

UNITED STATES PATENT OFFICE

RUDOLPH CASPARI, OF UERDINGEN-NIEDERRHEIN, GERMANY, ASSIGNOR, BY MESNE ASSIGNMENTS, TO GENERAL ANILINE WORKS, INC., OF NEW YORK, N. Y., A CORPORATION OF DELAWARE

MANUFACTURE OF CHROMIUM OXIDE AND CHROMIUM HYDROXIDE

No Drawing. Application filed April 25, 1927, Serial No. 186,596, and in Germany May 7, 1926.

The present invention concerns a process for the manufacture of chromium hydroxide and chromium oxide from alkali salts of chromic acid. In accordance with the new process solutions of chromates or bichromates in water are subjected to the action of reducing organic compounds at temperatures generally above 110° C., preferably in closed vessels under pressure, until the respective chromium compound is completely reduced to the trivalent condtion. It is most advantageous to employ such organic reducing agents, like molasses or the residues from the waste liquors of the sulfite cellulose manufacture, as are soluble in water. However, insoluble materials can likewise be used, saw-dust or brown coal dust, for example, having given good results. The higher the applied temperature, the shorter will be the time in which reduction is complete. The nature and appearance of the chromium hydroxide or oxide produced must depend to a certain extent on the reaction temperature and the concentration of the solutions employed, as will be seen from the capacity of being washed and filtered or the absence of impurities, resulting from the interaction of the strongly alkaline lyes and the iron vessels at the high temperature, for example. Chromium oxide does not dissolve in the alkaline lye to any noticeable extent.

The chromium hydroxide obtained is filtered from the aqueous solution, washed and dried. It has a beautiful green appearance and can be employed as a pigment or it can be converted by ignition into an anhydrous chromium oxide which is likewise distinguished by the beauty and power of the colour.

The alkali which was combined with the chromic acid can be recovered in the form of alkali carbonates by treatment with carbon dioxide or gases containing the same from the solutions after filtration from the chromium hydroxide.

The following examples will illustrate my invention: which is however in no wise limited thereby:—

Example 1.—100 litres of sodium chromate solution with a content of 23 kg. of $CrO_3$ are heated in a closed boiler provided with stirring apparatus at 133° C. (2 atm. pressure) for 18 hours with gradual addition of 18 kg. of molasses diluted with water. Thereupon the chromium hydroxide produced is separated from the liquid by filtration, carefully washed and converted into chromium oxide by ignition. The chromium oxide is again washed and dried at a temperature not exceeding 130° C.

If the reduction is effected at 158° C. and 5 atm. pressure the time required is only 9 hours.

Example 2.—100 litres of sodium bichromate solution with a content of 51 kg. $CrO_3$ are reduced at 151 C. (4 atm.) in the course of 5 hours by the gradual addition of diluted molasses. The working up is effected as described in the previous example.

Example 3.—100 litres of sodium bichromate solution having a content of 82 kg. $CrO_3$ are mixed in an open vessel with 63 kg. of diluted molasses and evaporated to dryness at about 130° C. The mass swells up and on burning off is reduced to a loose form of chromium oxide, which is washed with water, then again ignited, washed and dried.

Example 4.—100 litres of sodium bichromate solution of a content of $CrO_3=23$ kilos are heated for 2 hours at 10 atm. pressure (183° C.) in pressure vessel (provided with a stirrer) with sawdust, free from impurities. The working up is effected as described in the preceding examples.

I claim:—

1. The process for the reduction of alkali metal salts of chromic acid by heating the salts in aqueous solution with organic substances exerting a reducing action at temperatures between about 110° C. and about 183° C.

2. The process for the reduction of alkali salts of chromic acid by heating the salts in aqueous solution with water soluble organic substances exerting a reducing action at temperatures between about 110° C. and about 183° C.

3. The process for the reduction of alkali salts of chromic acid by heating the salts in aqueous solution with carbohydrates at temperatures between about 110° C. and about 183° C.

4. The process for the reduction of alkali salts of chromic acid by heating the salts in aqueous solution with organic compounds exerting a reducing action at pressures above that of the atmosphere and at temperatures between about 110° C. and about 183° C.

5. The process for the manufacture of chromium oxide, consisting in the washing, drying and ignition of the chromium hydroxide, produced by heating aqueous solutions of alkali salts of chromic acid with organic compounds exerting a reducing action at temperatures between about 110° C. and about 183° C.

6. The process for the reduction of alkali metal salts of chromic acid by heating the salts in aqueous solution with molasses at temperatures above 110° C.

7. The process for the reduction of alkali metal salts of chromic acid by heating the salts in aqueous solution with molasses at temperatures between about 133° C. and about 183° C. at pressures above that of the atmosphere.

8. The process for the reduction of alkali salts of chromic acid by heating the salts in aqueous solution with molasses at pressures above that of the atmosphere and at temperatures above 110° C.

9. The process for the reduction of alkali salts of chromic acid which comprises heating the salts in aqueous solution with such an amount of molasses as causes the formation of chromium hydroxide at pressures above that of the atmosphere and at temperatures above 110° C.

10. The process for the reduction of sodium chromate which comprises heating an aqueous solution of sodium chromate containing 1.3 parts by weight of $CrO_3$ with 1 part by weight of molasses at a pressure of 2 atmospheres and at a temperature of 133° C.

11. The process which comprises heating an alkali metal salt of chromic acid in aqueous solution with an organic substance exerting a reducing action at a temperature between about 110° C. and about 183° C. and converting the resulting chromium hydroxide to chromium oxide by ignition.

12. The process which comprises heating an alkali salt of chromic acid in aqueous solution with a water-soluble organic substance, exerting a reducing action at a temperature between about 110° C. and about 183° C. and converting the resulting chromium hydroxide to chromium oxide by ignition.

13. The process which comprises heating an alkali salt of chromic acid in aqueous solution with a carbohydrate at a temperature between about 110° C. and about 183° C. and converting the resulting chromium hydroxide to chromium oxide by ignition.

14. The process which comprises heating an alkali salt of chromic acid in aqueous solution with an organic compound exerting a reducing action at pressures above that of the atmosphere and at temperatures between about 110° C. and about 183° C. and converting the resulting chromium hydroxide to chromium oxide by ignition.

15. The process which comprises heating an alkali metal salt of chromic acid in aqueous solution with molasses at temperatures above 110° C. and converting the resulting chromium hydroxide to chromium oxide by ignition.

16. The process which comprises heating an alkali metal salt of chromic acid in aqueous solution with molasses at temperatures between about 133° C. and about 183° C. and converting the resulting chromium hydroxide to chromium oxide by ignition.

17. The process which comprises heating an alkali salt of chromic acid in aqueous solution with molasses at pressures above that of the atmosphere, and at temperatures above 110° C., and converting the resulting chromium hydroxide to chromium oxide by ignition.

18. The process which comprises heating an alkali salt of chromic acid in aqueous solution with such an amount of molasses as causes the formation of chromium hydroxide, at pressures above that of the atmosphere and at temperatures above 110° C. and converting the resulting hydroxide to chromium oxide by ignition.

19. The process which comprises heating an aqueous solution of sodium chromate containing 1.3 parts by weight of $CrO_3$ with 1 part by weight of molasses at a pressure of 2 atmospheres and at a temperature of 133° C. and converting the resulting chromium hydroxide to chromium oxide by ignition.

In testimony whereof I have hereunto set my hand.

RUDOLPH CASPARI.